(12) United States Patent
Kondo et al.

(10) Patent No.: US 10,150,085 B2
(45) Date of Patent: Dec. 11, 2018

(54) MEMBRANE-FORMING DOPE FOR CARBON MEMBRANES AND A METHOD FOR PRODUCING A CARBON HOLLOW FIBER MEMBRANE USING THE SAME

(71) Applicant: NOK CORPORATION, Tokyo (JP)

(72) Inventors: Masataka Kondo, Shizuoka (JP); Kensuke Watanabe, Sizuoka (JP); Hirokazu Yamamoto, Shizuoka (JP)

(73) Assignee: NOK Corporation, Tokyo (JP)

( * ) Notice: Subject to any disclaimer, the term of this patent is extended or adjusted under 35 U.S.C. 154(b) by 20 days.

(21) Appl. No.: 15/515,940

(22) PCT Filed: Oct. 9, 2015

(86) PCT No.: PCT/JP2015/078773
§ 371 (c)(1),
(2) Date: Mar. 30, 2017

(87) PCT Pub. No.: WO2016/067900
PCT Pub. Date: May 6, 2016

(65) Prior Publication Data
US 2017/0296978 A1 Oct. 19, 2017

(30) Foreign Application Priority Data

Apr. 8, 2015 (JP) ................................. 2015-079206

(51) Int. Cl.
*B01D 53/22* (2006.01)
*B01D 69/08* (2006.01)
(Continued)

(52) U.S. Cl.
CPC ......... *B01D 69/087* (2013.01); *B01D 53/228* (2013.01); *B01D 69/08* (2013.01);
(Continued)

(58) Field of Classification Search
CPC .............. B01D 69/08; B01D 2053/224; B01D 53/228; B01D 69/087; B01D 71/021; B01D 69/141; C01B 32/05; C01B 31/02
See application file for complete search history.

(56) References Cited

U.S. PATENT DOCUMENTS

| 3,311,587 A | * | 3/1967 | Fox | .......................... | C08K 3/06 |
| | | | | | 524/80 |
| 3,735,559 A | * | 5/1973 | Salemme | ............. | B01D 53/268 |
| | | | | | 261/104 |

(Continued)

FOREIGN PATENT DOCUMENTS

| EP | 0617997 A1 | 10/1994 |
| JP | 62-030508 | 2/1987 |

(Continued)

OTHER PUBLICATIONS

International Preliminary Report on Patentability and Written Opinion from corresponding PCT application No. PCT/JP2015/078773 dated May 2, 2017 (7 pgs).

(Continued)

*Primary Examiner* — Anthony R Shumate
(74) *Attorney, Agent, or Firm* — Brinks Gilson & Lione

(57) ABSTRACT

A membrane-forming dope for carbon membranes, comprising polyphenylene oxide in an amount giving a concentration of 15 to 40 wt. % in the membrane-forming dope, and sulfur in an amount giving a ratio of 0.1 to 5.0 wt. %, preferably 0.2 to 3.0 wt. %, of the total weight of the polyphenylene oxide and the sulfur, both of which are dissolved in a solvent that can dissolve these components. A hollow fiber carbon membrane is produced by molding the membrane-forming dope for carbon membranes in a hollow shape by means of a wet or dry-wet spinning method using a double tubular nozzle, subjecting the molded product to an infusibilization treatment by heating at 150 to 350° C. in the (Continued)

air, and then subjecting it to a carbonization treatment by heating at 600 to 800° C. in an inert atmosphere or under vacuum. When the product molded in a hollow shape by means of a wet or dry-wet spinning method is subjected to an infusibilization treatment by heating in the air while stretching the product with a stress of 0.002 to 0.005 MPa, a hollow fiber carbon membrane having excellent gas permeability and a further high gas separation factor (He/$CH_4$) can be obtained.

8 Claims, 4 Drawing Sheets

(51) Int. Cl.
  *C01B 31/02* (2006.01)
  *B01D 71/02* (2006.01)
  *B01D 69/14* (2006.01)
  *C01B 32/05* (2017.01)

(52) U.S. Cl.
  CPC ......... *B01D 69/141* (2013.01); *B01D 71/021* (2013.01); *C01B 31/02* (2013.01); *C01B 32/05* (2017.08); *B01D 2053/224* (2013.01)

(56) References Cited

U.S. PATENT DOCUMENTS

| | | | | |
|---|---|---|---|---|
| 5,348,569 | A * | 9/1994 | Bikson | B01D 53/228 95/45 |
| 5,356,459 | A * | 10/1994 | Bikson | B01D 53/22 55/524 |
| 5,364,454 | A * | 11/1994 | Bikson | B01D 53/228 95/45 |
| 5,635,067 | A * | 6/1997 | Macheras | B01D 53/228 210/500.23 |
| 5,695,818 | A | 12/1997 | Soffer et al. | |
| 5,989,742 | A * | 11/1999 | Cabasso | B01D 71/52 429/493 |
| 6,103,414 | A * | 8/2000 | Cabasso | B01D 71/52 429/309 |
| 2002/0045085 | A1 * | 4/2002 | Formato | B01D 67/0088 429/535 |
| 2002/0061431 | A1 * | 5/2002 | Koyama | C08J 5/2256 429/481 |
| 2004/0187558 | A1 * | 9/2004 | Dye | B01D 53/228 73/31.07 |
| 2008/0241431 | A1 * | 10/2008 | Hirai | C09K 19/2007 428/1.31 |
| 2009/0176052 | A1 * | 7/2009 | Childs | B01D 67/0009 428/101 |
| 2010/0071557 | A1 * | 3/2010 | Seiler | B01D 53/228 96/12 |
| 2010/0212503 | A1 | 8/2010 | Yoshimune et al. | |
| 2016/0046491 | A1 * | 2/2016 | Mihara | C01B 32/00 428/312.2 |
| 2017/0320020 | A1 * | 11/2017 | Watanabe | B01D 69/08 |

FOREIGN PATENT DOCUMENTS

| | | |
|---|---|---|
| JP | 63-028406 | 2/1988 |
| JP | 7-51551 | 2/1995 |
| JP | 2000-185212 | 7/2000 |
| JP | 2009/34614 A | 2/2009 |
| JP | 2010-188241 A | 9/2010 |
| JP | 2013-063415 | 4/2013 |
| JP | 2013-071073 | 4/2013 |
| JP | 2013-094744 | 5/2013 |

OTHER PUBLICATIONS

International Search Report from corresponding PCT application No. PCT/JP2015/078773 dated Dec. 28, 2015 (4 pgs).
Yingqian, Ren et al., "Solubility of elemental sulfur in pure organic solvents and organic solventionic liquid mixtures from 293.15 to 353.15K", *Fluid Phase Equilibria Elsevier*, Amsterdam, NL, 312, 2011 (pp. 31-36.
Yoshimune, M. et al., "Flexible carbon hollow fiber membranes derived from sulfonated poly(phenylene oxide)", *Separation and Purification Technology, Elsevier Science*, Amsterdam, NL, vol. 75, No. 2, Oct. 13, 2010 (pp. 193-197) XP027322843, ISSN: 1383-5866.

* cited by examiner

[Fig. 1]
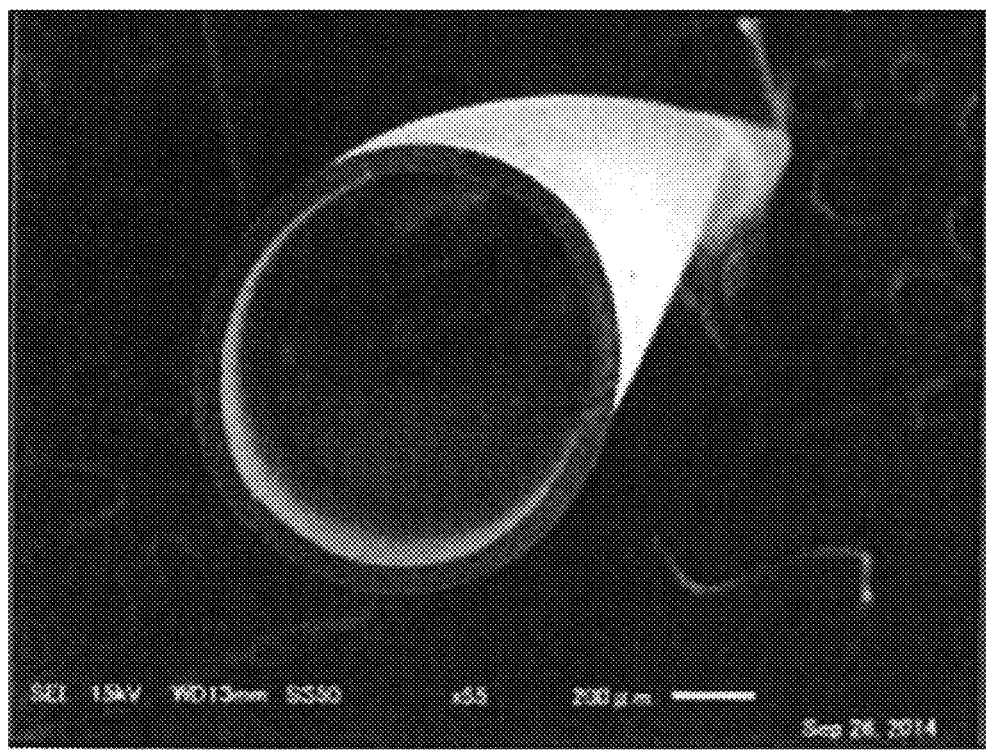

[Fig. 2]
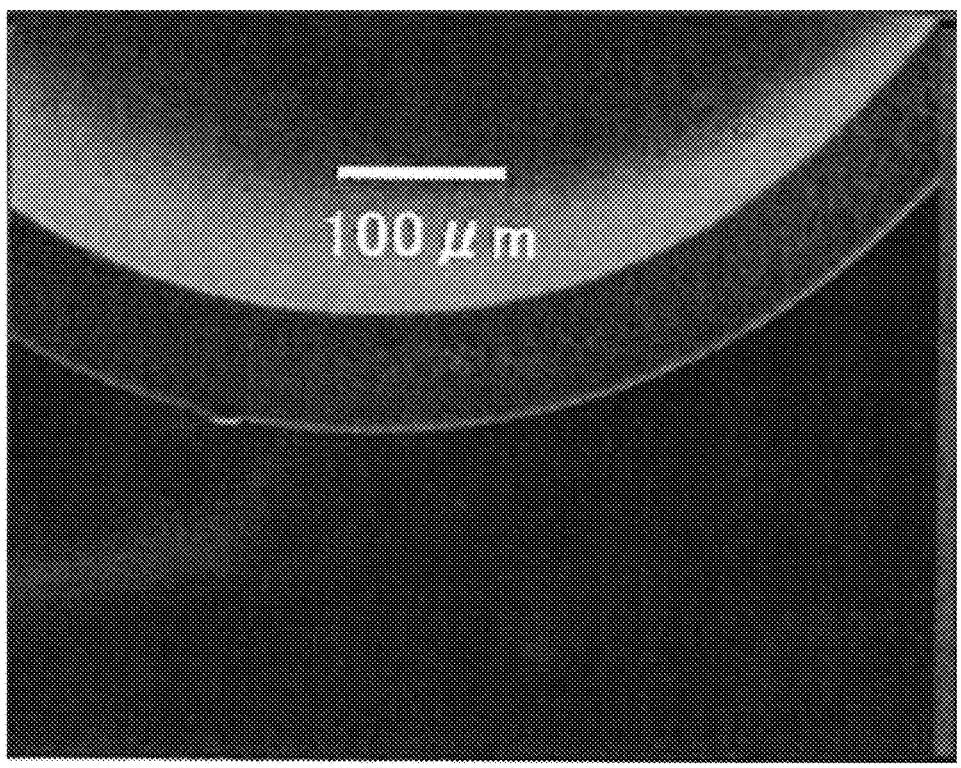
[Fig.3]
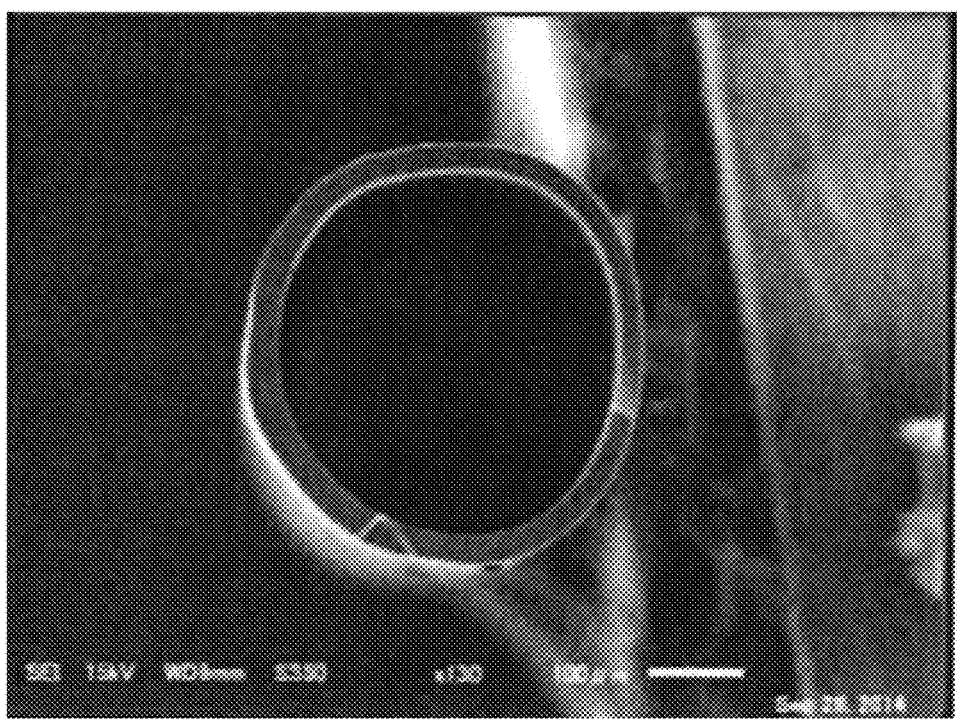

[Fig. 4]
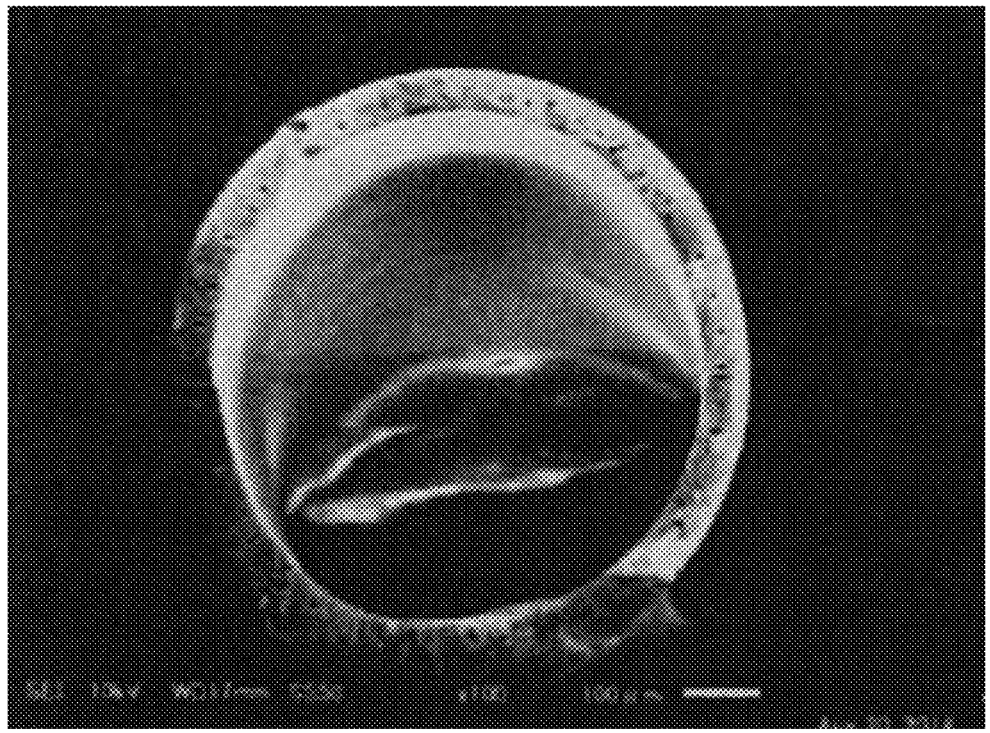
[Fig. 5]
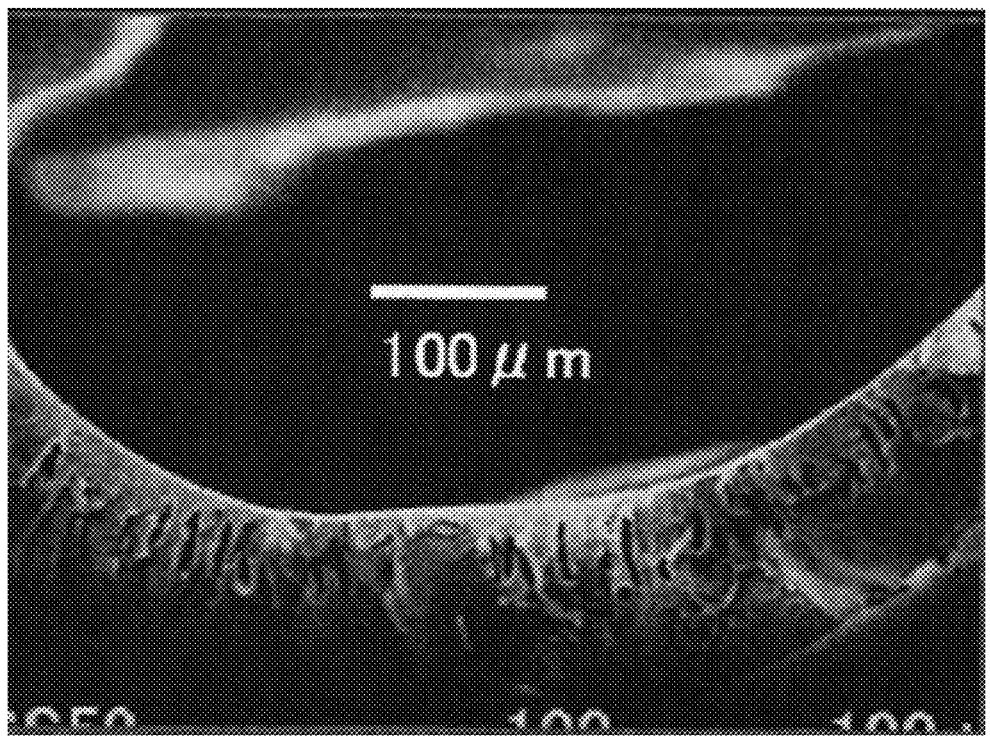

[Fig. 6]
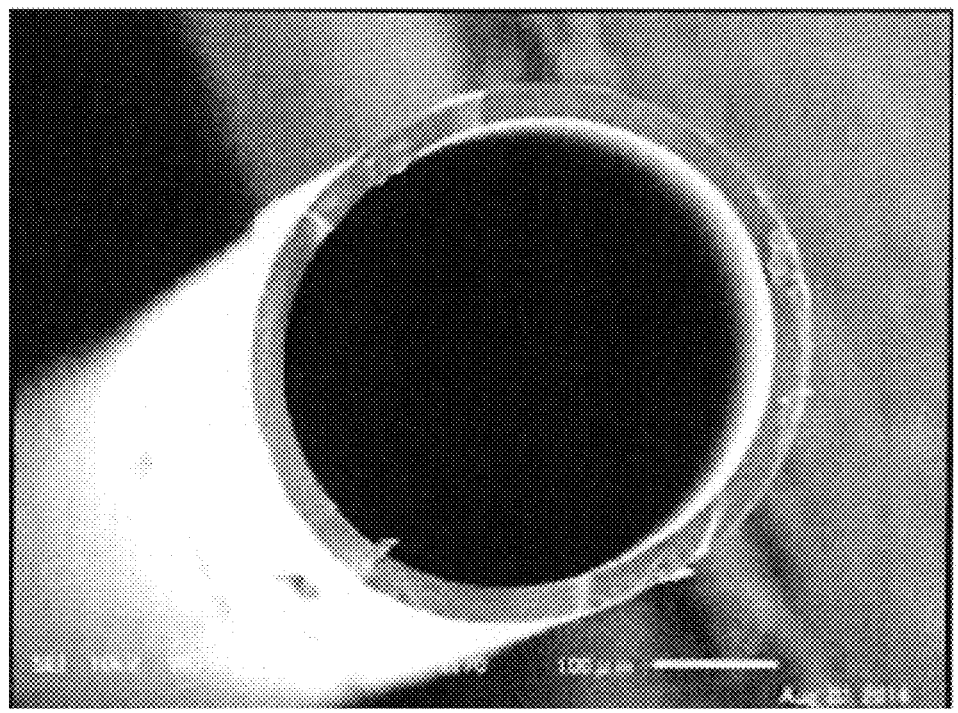
[Fig. 7]
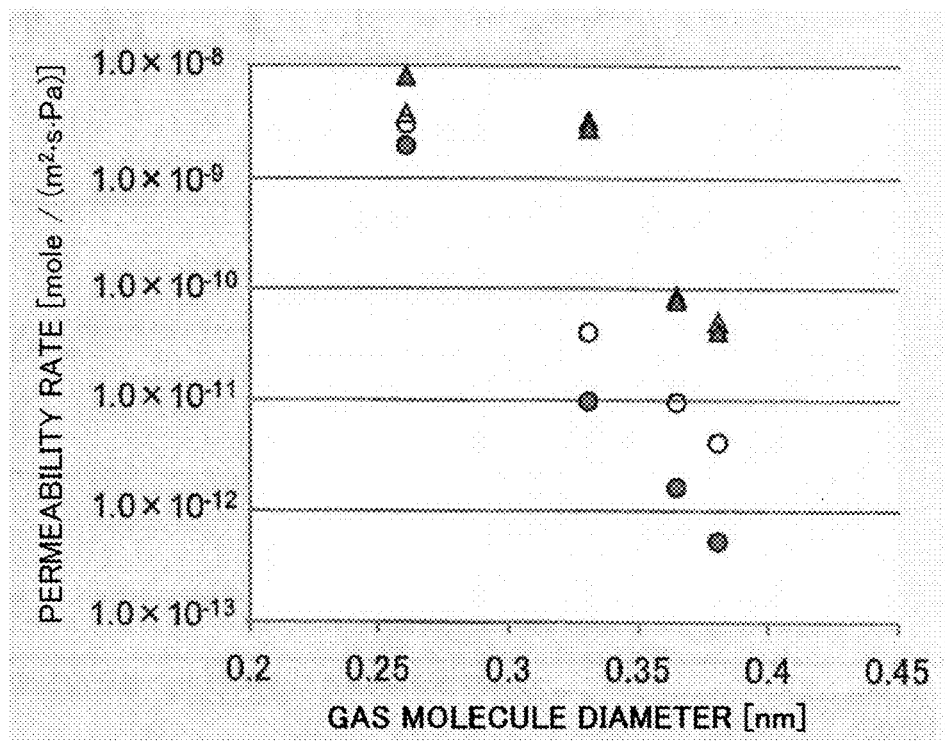

MEMBRANE-FORMING DOPE FOR CARBON MEMBRANES AND A METHOD FOR PRODUCING A CARBON HOLLOW FIBER MEMBRANE USING THE SAME

RELATED APPLICATION

This application is a 35 U.S.C. § 371 national phase filing of International Patent Application No. PCT/JP2015/078773, filed Oct. 9, 2015, through which and to which priority is claimed under 35 U.S.C. § 119 to Japanese Patent Application Nos. 2014-221063, filed Oct. 30, 2014 and 2015-079206, Apr. 8, 2015, the entire disclosures of which is hereby expressly incorporated by reference.

TECHNICAL FIELD

The present invention relates to a membrane-forming dope for carbon membranes and a method for producing a carbon hollow fiber membrane using the same. More particularly, the present invention relates to a membrane-forming dope for carbon membranes, comprising polyphenylene oxide as a main component, and a method for producing a carbon hollow fiber membrane having excellent gas separation performance, using the same.

BACKGROUND ART

Various organic membranes and inorganic membranes have conventionally been proposed as separation membranes. However, organic membranes have low solvent resistance and heat resistance, although they are inexpensive and excellent in moldability. As opposed to organic membranes, inorganic membranes, such as ceramic membranes, have excellent solvent resistance and heat resistance; however, they have problems of high cost and difficulty in molding.

Accordingly, carbon membranes, which are inorganic membranes, but have excellent moldability and are inexpensive, have recently attracted attention. Hollow fiber carbon membranes have pores of a size that allows gas separation, and exhibit excellent gas separation performance among various inorganic membranes. Further, hollow fiber carbon membranes can be used in an environment for which heat resistance against a temperature as high as about 70 to 150° C., at which organic membranes cannot be used, chemical resistance, and solvent resistance are required. Accordingly, the practical use of hollow fiber carbon membranes is highly expected. Moreover, hollow fiber membranes have advantages of excellent pressure resistance, a large membrane area per unit volume, and capability of producing compact separation membrane modules.

Conventionally proposed hollow fiber carbon membranes are those produced, for example, using a resin obtained by sulfonating polyphenylene oxide (Patent Documents 1 and 2), and using aromatic polyimide (Patent Document 3), as a raw material.

However, sulfonated polyphenylene oxide itself is not a versatile material, and therefore requires a synthesis process to sulfonate polyphenylene oxide. On the other hand, the synthesis of aromatic polyimide requires a reaction in an organic solvent; however, since it is difficult to ensure the solubility in the organic solvent, a special production method is necessary. Thus, carbon membranes produced using sulfonated polyphenylene oxide or aromatic polyimide as a raw material have problems of high membrane cost, because raw materials are expensive, and the preparation of raw materials and the membrane-forming process are complicated.

In contrast, a carbon membrane produced using inexpensive polyphenylene oxide as a raw material is also proposed (Patent Document 4). However, separation properties are low only with polyphenylene oxide; therefore, ensuring separation properties requires a complicated structure in which a sulfonated polyphenylene oxide resin is laminated on a polyphenylene oxide membrane, followed by calcination treatment, and the production process is complicated. Accordingly, there is a problem of high cost, despite the use of the inexpensive raw material.

Carbon membranes produced using any raw material generally require two-step heating comprising, in this order, an "infusibilization treatment" in which a hollow fiber is spun, cut into a predetermined length, then inserted in a tube made of PFA resin, etc., and heated at about 250 to 350° C. in the air; and a "carbonization treatment" in which heating is performed at about 600 to 800° C. in an inert atmosphere or under vacuum.

Therefore, in order to produce carbon hollow fiber membranes with excellent cost performance, there is a demand for a production method in which a hollow fiber is spun using inexpensive materials, and without adopting complicated processes, a two-step heating process comprising an infusibilization step and a carbonization step is performed as a main process.

Furthermore, there is an increasing demand for carbon membranes with still higher functionality having a high permeability rate for helium, hydrogen, steam, etc., and high ability to separate these gases.

PRIOR ART DOCUMENTS

Patent Documents

Patent Document 1: JP-A-2009-34614
Patent Document 2: JP-A-2013-94744
Patent Document 3: JP-A-2000-185212
Patent Document 4: JP-A-2013-63415
Patent Document 5: JP-A-62-30508
Patent Document 6: JP-A-63-28406
Patent Document 7: JP-A-7-51551

OUTLINE OF THE INVENTION

Problem to be Solved by the Invention

An object of the present invention is to provide a membrane-forming dope for carbon membranes, comprising polyphenylene oxide as a main component, and capable of producing a carbon membrane with high functionality, such as high gas separation performance, using versatile materials, and to provide a method for producing a hollow fiber carbon membrane using the same.

Means for Solving the Problem

The above object of the present invention can be achieved by a membrane-forming dope for carbon membranes, comprising polyphenylene oxide in an amount giving a concentration of 15 to 40 wt. % in the membrane-forming dope, and sulfur in an amount giving a ratio of 0.1 to 5.0 wt. %, preferably 0.2 to 3.0 wt. %, of the total weight of the polyphenylene oxide and the sulfur, both of which are dissolved in a solvent that can dissolve these components. A hollow fiber carbon membrane is produced by molding the membrane-forming dope for carbon membranes in a hollow shape by means of a wet or dry-wet spinning method using a double tubular nozzle, subjecting the molded product to an infusibilization treatment by heating at 150 to 350° C. in the air, and then subjecting it to a carbonization treatment by heating at 600 to 800° C. in an inert atmosphere or under vacuum. It is preferable that the product molded in a hollow shape by means of a wet or dry-wet spinning method is subjected to an infusibilization treatment by heating in the air while stretching the product with a stress of 0.002 to 0.005 MPa.

Effect of the Invention

The materials used in the membrane-forming dope of the present invention are all versatile materials. As the spinning method, the same method for general industrial water treatment membranes can be used. This ensures excellent effects that, while reducing the cost of producing hollow fiber carbon membranes and improving the mass productivity, a carbon membrane with high functionality, such as high gas separation performance, can be produced.

Moreover, as a membrane for gas separation, in order to adjust the membrane strength and the permeability rate depending on the use conditions, it is desirable that the inner and outer diameter and the film thickness of the hollow fiber can be freely adjusted within a certain range. When the production method according to the present invention is used, the hollow fiber in the spinning stage can be freely adjusted within a range in which the outer diameter is 500 to 3000 μm, and the thickness is 50 to 1000 μm. Thus, a flexible approach can be taken in terms of membrane design.

Furthermore, because the formed carbon membrane has high separation performance, the carbon membrane also has the effect of increasing the purity of the low-molecular gas on the penetration side. In particular, when an infusibilization treatment is performed by heating in the air while applying stress by stretching, porous pores of 1 nm or less in diameter are formed in a carbon hollow fiber membrane to be obtained. Therefore, a hollow fiber carbon membrane having excellent gas permeability and a high gas separation factor can be obtained.

BRIEF DESCRIPTION OF DRAWINGS

FIG. 1: A figure showing a magnified SEM image (×55) of the hollow fiber membrane obtained after spinning and drying in Example 1.

FIG. 2: A figure showing a magnified SEM image (×100) of the hollow fiber membrane obtained after spinning and drying in Example 1.

FIG. 3: A figure showing a magnified SEM image (×170) of the hollow fiber carbon membrane obtained after treatments of infusibilization and carbonization in Example 1.

FIG. 4: A figure showing a magnified SEM image (×55) of the hollow fiber membrane obtained after spinning and drying in Comparative Example 1.

FIG. 5: A figure showing a magnified SEM image (×100) of the hollow fiber membrane obtained after spinning and drying in Comparative Example 1.

FIG. 6: A figure showing a magnified SEM image (×130) of the hollow fiber carbon membrane obtained after treatments of infusibilization and carbonization in Comparative Example 1.

FIG. 7: A figure graphing the results of a gas permeability test conducted in Examples 1 and 2, and Comparative Examples 1 and 2 in the relationship between the gas molecule diameter and the gas permeability rate.

EMBODIMENTS FOR CARRYING OUT THE INVENTION

As the polyphenylene oxide, a commercial product, such as PP0646 (produced by SABIC), or PX100F or PX100L (produced by Mitsubishi Engineering-Plastics Corporation), can be used as they are. The polyphenylene oxide is used at a ratio of about 15 to 40 wt. %, preferably about 20 to 35 wt. %, in the membrane-forming dope. If the concentration of polyphenylene oxide is higher than this range, the membrane-forming dope is separated, and spinning cannot be performed. In contrast, if the concentration of polyphenylene oxide is lower than this range, the membrane is fragile during calcination, and an excellent carbon membrane cannot be obtained in some cases.

To the membrane-forming dope, sulfur is further added in an amount giving a ratio of 0.1 to 5.0 wt. %, preferably 0.2 to 3.0 wt. %, of the total weight of the polyphenylene oxide and the sulfur. If the ratio of sulfur is higher than this range, the membrane-forming dope is separated, and spinning cannot be performed. In contrast, if the ratio of sulfur is lower than this range, the effects obtained by the addition of sulfur, such as high gas separation performance, cannot be exhibited.

In the membrane-forming dope, a component having a crosslinking effect can also be used by adding in combination with sulfur. Examples of the component include organic peroxides, such as dialkyl-based peroxides (e.g., di(2-tert-butylperoxyisopropyl)benzene, dicumyl peroxide, 2,5-dimethyl-2,5-di(tert-butylperoxy)hexane, and 2,5-dimethyl-2,5-di(tert-butylperoxy)hexyne-3), diacyl-based peroxides (e.g., diisobutyryl peroxide), phenol resin crosslinking agents, quinone dioxime crosslinking agents, and the like.

The preparation of the membrane-forming dope for carbon membranes is performed by dissolving polyphenylene oxide and sulfur (and an additive) in a solvent that can dissolve these components. Dissolution is performed in such a manner that sulfur is first dissolved in a solvent, and polyphenylene oxide is then dissolved. Examples of the solvent include methanol, ethanol, tetrahydrofuran, N, N-dimethylacetamide, N-methyl-2-pyrrolidone, and the like; aprotic polar solvents, such as N, N-dimethylacetamide and N-methyl-2-pyrrolidone, are preferably used.

Here, if the spinning dope undergoes phase separation during spinning, stable spinning cannot be performed. Therefore, as the membrane-forming solution at the time of spinning and membrane formation, a phase-stabile with a phase-stable temperature, preferably one with, the absolute value calculated by [the temperature during membrane formation—the temperature at which phase separation occurs] of 10° C. or above is used.

The prepared membrane-forming dope is extruded by a wet spinning method or a dry-wet spinning method into a coagulation bath directly or through free running from the outer tube of a hollow fiber spinning nozzle having a double tubular structure. If necessary, a core liquid that is immiscible with polymer of the membrane-forming dope is simultaneously extruded from the inner tube of the spinning nozzle. Thus, a polyphenylene oxide hollow fiber membrane is formed by a non-solvent induced phase separation method. The core liquid and the coagulation bath used herein are solvents (e.g., water or ethylene glycol) that are miscible with the solvent of the membrane-forming dope, but immiscible with the polyphenylene oxide. Moreover, the temperatures of the core liquid and the coagulation bath in this case are generally about-20 to 60° C., preferably about 0 to 30° C.

The obtained polyphenylene oxide hollow fiber membrane is washed with water, if necessary, and then dried; that is, the moisture content is removed from the polyphenylene oxide portion in the hollow fiber membrane. The conditions of drying are not particularly limited, as long as the polyphenylene oxide hollow fiber membrane is completely dried. In general, drying is performed at about 20 to 80° C., preferably about 25 to 35° C., for about 0.5 to 4 hours. In addition, the hollow fiber membrane after spinning is, for example, wound on a bobbin while blowing hot air at about 60 to 240° C. Here, in the cross-sectional structure of the hollow fiber membrane dried after spinning, when sulfur is not added, a void structure (voids) of a size of several tens of microns is partially observed (see FIGS. 4 to 6 relating to Comparative Example 1), whereas when sulfur is added to the membrane-forming dope, such a void structure is not observed (see FIGS. 1 to 3 relating to Example 1).

The dried polyphenylene oxide hollow fiber membrane is subjected to an infusibilization treatment prior to a carbonization treatment. The infusibilization treatment is performed by heating at about 150 to 350° C. for about 1 minute to 2 hours. Due to the infusibilization treatment, a dense structure in which no pores are observed by a SEM at a magnification of 5000 can be obtained.

In addition to the above-mentioned infusibilization treatment without the application of stress, an infusibilization treatment can also be performed by heating at a temperature of about 250 to 350° C., which is lower than the carbonization temperature, for about 0.5 to 4 hours, while applying stress to the hollow fiber membrane. The stress applied to the hollow fiber membrane during the infusibilization treatment is applied, for example, by stretching the spun hollow fiber membrane during winding on a bobbin. The degree of stress varies depending on the membrane thickness and size of the hollow fiber membrane. For example, a stress of about 0.002 to 0.005 MPa is applied to a hollow fiber membrane having an outer diameter of about 400 to 500 μm and an inner diameter of about 350 to 450 μm. According to a conventional method, heating is generally performed without the application of stress in the air, that is, in a state in which no force in the stretching direction is applied; however, according to the present invention, the infusibilization treatment performed while applying stress contributes to excellent effects that porous pores of 1 nm or less can be formed in the carbon hollow fiber membrane, and the resulting hollow fiber carbon membrane has excellent gas permeability and a high separation factor.

Patent Documents 5 and 6 disclose that, after membrane formation, the resulting membrane is stretched while heating for pore formation or expansion; however, in these methods, the membrane is not stretched during the infusibilization treatment. Patent Document 5 indicates that a cellulose-based membrane is stretched to adjust the pore size to 10 μm or less. Patent Document 6 indicates that the pore size of a crystalline membrane is adjusted to 0.1 to 1.0 μm. However, in both inventions, a membrane comprising a mixture of crystals and non-crystals is merely stretched to adjust the pore size in the non-crystal portion. These inventions are significantly different from an invention in which the pore size of porous pores in a carbon membrane is adjusted to 1 nm or less by stretching during the infusibilization treatment, as in the present invention.

The carbonization treatment is performed by heating a precursor polymer hollow fiber membrane by a known method wherein, for example, the precursor polymer hollow fiber membrane is housed in a container, and heated at a reduced pressure of $10^{-4}$ atm or less (about 10 Pa or less) or in an inert gas atmosphere replaced by helium, argon gas, nitrogen gas, or the like. The heating conditions vary depending on the type of material that constitutes the precursor polymer, the amount thereof, etc. In general, conditions of about 600 to 800° C. and about 0.5 to 4 hours are applied at a reduced pressure of above $10^{-4}$ atm or less (about 10 Pa or less) or in an inert gas atmosphere mentioned above.

In order to further improve the separation performance of the obtained hollow fiber carbon membrane, the surface thereof can be subjected to chemical vapor deposition (CVD), which is a known technique (see Patent Document 7, etc.), preferably a CVD treatment using hydrocarbon gas, such as propylene, butane, or cyclohexane. Due to the CVD treatment, a carbon membrane obtained by adding sulfur to the spinning dope achieves higher separation properties compared with those of a carbon membrane to which sulfur is not added.

EXAMPLES

The following describes the present invention with reference to Examples.

Example 1

A spinning dope comprising 28 parts by weight of polyphenylene oxide resin (PP0646, produced by SABIC), 0.6 parts by weight of sulfur (produced by Kanto Chemical Co., Inc.), and 71.4 parts by weight of dimethylacetamide was prepared by first dissolving the sulfur in the dimethylacetamide, and then dissolving the polyphenylene oxide resin.

The prepared spinning dope was heated to 150° C., and extruded into a water coagulation bath using a spinning nozzle having a double tubular structure while using ethylene glycol as a core liquid, and dry-wet spinning was performed at a spinning rate of 15 m/min. Thereafter, the resultant was dried in an oven at 60° C., thereby obtaining a porous polyphenylene oxide hollow fiber membrane having an outer diameter of 1060 μm and an inner diameter of 930 μm. FIGS. 1 and 2 show magnified SEM images of the cross-section of the hollow fiber membrane after spinning and drying.

Subsequently, the obtained hollow fiber membrane was inserted into a tube made of perfluoroalkoxyalkane resin (PFA: tetrafluoroethylene-perfluoroalkyl vinyl ether copolymer resin), and subjected to an infusibilization treatment by heating at a temperature of 290° C. for 1 hour in the air. Further, the infusibilized hollow fiber membrane was inserted into a quartz tube, and subjected to a carbonization treatment by heating at a temperature of 650° C. for 1 hour in a nitrogen atmosphere, thereby obtaining a hollow fiber carbon membrane having an outer diameter of 430 μm and an inner diameter of 370 μm. FIG. 3 shows a magnified SEM image of the cross-section of the obtained hollow fiber carbon membrane. Further, a gas permeability test was conducted using the obtained carbon membrane.

Gas permeability test: One end of the carbon membrane was sealed by adhesion with an epoxy resin, and the other end was inserted into a piping part of a metal gasket gland (6LV-4-VCR-3S-6MTB7, produced by Swagelok) for 10 mm. The gap between the inserted part of the carbon membrane of up to 5 mm and the pipe of the gland was bonded with an epoxy resin, thereby producing a mini module for evaluating gas separation. The mini module was attached to a gas separation device, and different gases were flown on the outside of the carbon membrane at a pressure of 200 kPa g. The flow rate of the gas penetrating to the tube side was measured by a mass flow controller, and the obtained gas flow rate was divided by the membrane area, time, and pressure to calculate the gas permeability rate.

Example 2

The hollow fiber carbon membrane obtained in Example 1 was subjected to a CVD treatment at 650° C. for 2 minutes in a propylene gas atmosphere. The magnified SEM image of the cross-section of the obtained hollow fiber carbon membrane was the same as that of Example 1 (FIG. 3). Further, the gas permeability test was also conducted on the hollow fiber carbon membrane after the CVD treatment.

Comparative Example 1

In Example 1, dry-wet spinning was performed using a spinning dope that was prepared without using sulfur and by changing the amount of dimethylacetamide to 72 parts by weight. After drying, a porous polyphenylene oxide hollow fiber membrane having an outer diameter of 800 μm and an inner diameter of 650 μm was obtained. Further, after an infusibilization treatment and a carbonization treatment, a hollow carbon membrane having an outer diameter of 435 μm and an inner diameter of 375 μm was obtained. FIGS. 4 and 5 show magnified SEM images of the cross-section of the hollow fiber membrane after spinning and drying, and FIG. 6 shows a magnified SEM image of the cross-section of the hollow fiber carbon membrane after the infusibilization treatment and the carbonization treatment.

Comparative Example 2

The hollow fiber carbon membrane obtained in Comparative Example 1 was subjected to a CVD treatment at 650° C. for 2 minutes in a propylene gas atmosphere. The magnified SEM image of the cross-section of the obtained hollow fiber carbon membrane was the same as that of Comparative Example 1 (FIG. 6). Further, the gas permeability test was also conducted on the hollow fiber carbon membrane after the CVD treatment.

Table 1 below shows the results of the gas permeability test obtained in the above Examples and Comparative Examples, together with the separation factor. Further, FIG. 7 (▲: Example 1, ●: Example 2, Δ: Comparative Example 1, and ○: Comparative Example 2) shows a graph of the relationship between the gas molecule diameter and the gas permeability rate.

TABLE 1

| Example | Gas permeability rate (mole/m$^2$ · sec · Pa) | | | | Separation factor α (He/CH$_4$) |
|---|---|---|---|---|---|
| | He | CO$_2$ | N$_2$ | CH$_4$ | |
| Ex. 1 | $8.3 \times 10^{-9}$ | $2.8 \times 10^{-9}$ | $8.2 \times 10^{-11}$ | $4.3 \times 10^{-11}$ | 193 |
| Ex. 2 | $2.0 \times 10^{-9}$ | $1.0 \times 10^{-11}$ | $1.7 \times 10^{-12}$ | $5.6 \times 10^{-13}$ | 3571 |
| Comp. Ex. 1 | $3.8 \times 10^{-9}$ | $3.3 \times 10^{-9}$ | $8.8 \times 10^{-11}$ | $5.2 \times 10^{-11}$ | 73 |
| Comp. Ex. 2 | $3.1 \times 10^{-9}$ | $4.2 \times 10^{-11}$ | $9.8 \times 10^{-12}$ | $4.3 \times 10^{-12}$ | 721 |

Example 3

The spinning dope prepared in Example 1 was heated to 150° C., and extruded into a water coagulation bath using a spinning nozzle having a double tubular structure while using ethylene glycol as a core liquid, and dry-wet spinning was performed at a spinning rate of 15 to 20 m/min. Thereafter, the resultant was wound on a bobbin while drying by blowing hot air of 220° C., thereby obtaining a porous hollow fiber membrane having an outer diameter of 450 μm and an inner diameter of 395 μm.

Subsequently, while applying a stress of 0.004 MPa, the hollow fiber membrane was subjected to an infusibilization treatment by heating at a temperature of 320° C. for 1 hour in the air. Further, the infusibilized hollow fiber membrane was inserted into a quartz tube, and subjected to a carbonization treatment by heating at a temperature of 700° C. for 45 minutes in a nitrogen atmosphere. Finally, a CVD treatment was performed at a temperature of 700° C. for 5 minutes in a nitrogen and propylene gas atmospheres, thereby obtaining a porous hollow fiber carbon membrane having an outer diameter of 265 μm and an inner diameter of 220 μm. The same gas permeability test as described above was conducted using the obtained carbon membrane.

Example 4

In Example 3, the stress applied to the hollow fiber membrane during the infusibilization treatment was changed to 0.005 MPa, and a porous hollow fiber carbon membrane having an outer diameter of 200 μm and an inner diameter of 165 μm was obtained.

Example 5

In Example 3, the infusibilization treatment was performed, without applying stress to the hollow fiber membrane, by heating at a temperature of 320° C. for 1 hour in the air, and a porous hollow fiber carbon membrane having an outer diameter of 315 μm and an inner diameter of 270 μm was obtained.

Comparative Example 3

In Example 3, when the stress applied to the hollow fiber membrane during the infusibilization treatment was changed to 0.006 MPa, the hollow fiber membrane was broken, and a porous hollow fiber carbon membrane was not able to be obtained.

Table 2 below shows the results obtained in Examples 3 to 5 above, together with the stress applied to the hollow fiber membranes during the infusibilization treatment, and the membrane thickness of the hollow fiber carbon membranes.

TABLE 2

| Example | Stress applied (MPa) | Membrane thickness (μm) | Gas permeability rate (mole/m$^2$ · sec · Pa) | | | | Separation factor α (He/CH$_4$) |
|---|---|---|---|---|---|---|---|
| | | | He | CO$_2$ | N$_2$ | CH$_4$ | |
| Ex. 3 | 0.004 | 22.5 | $5.1 \times 10^{-9}$ | $3.1 \times 10^{-11}$ | $1.6 \times 10^{-12}$ | $6.9 \times 10^{-13}$ | 7385 |
| Ex. 4 | 0.005 | 17.5 | $6.1 \times 10^{-9}$ | $9.8 \times 10^{-12}$ | $9.9 \times 10^{-13}$ | $3.9 \times 10^{-13}$ | 15649 |
| Ex. 5 | 0 | 22.5 | $4.3 \times 10^{-9}$ | $4.9 \times 10^{-11}$ | $1.8 \times 10^{-12}$ | $7.1 \times 10^{-13}$ | 6085 |

INDUSTRIAL APPLICABILITY

The carbon membrane according to the present invention can be effectively used for the purpose of removing only hydrogen or helium from a mixed gas of a beneficial low-molecular gas, such as hydrogen or helium, and an organic gas, such as methane or toluene, and used as a membrane for vapor separation and membrane surface distillation, etc. Furthermore, due to the excellent heat resistance and chemical resistance, the carbon membrane according to the present invention can also be used for applications for which organic membranes cannot be used.

The invention claimed is:

1. A membrane-forming dope for carbon membranes, comprising polyphenylene oxide in an amount giving a concentration of 15 to 40 wt. % in the membrane-forming dope, and sulfur in an amount giving a ratio of 0.1 to 5.0 wt. % of the total weight of the polyphenylene oxide and the sulfur, both of which are dissolved in a solvent that can dissolve these components.

2. The membrane-forming dope for carbon membranes according to claim 1, further comprising an organic peroxide, a phenol resin crosslinking agent, or a quinone dioxime crosslinking agent.

3. A method for producing a hollow fiber carbon membrane, comprising molding the membrane-forming dope for carbon membranes according to claim 1 in a hollow shape by means of a wet or dry-wet spinning method using a double tubular nozzle, subjecting the molded product to an infusibilization treatment by heating at 150 to 350° C. in the air, and then subjecting it to a carbonization treatment by heating at 600 to 800° C. in an inert atmosphere or under vacuum.

4. The method for producing a hollow fiber carbon membrane according to claim 3, wherein the product molded in a hollow shape by means of a wet or dry-wet spinning method is subjected to an infusibilization treatment by heating in the air while stretching the product with a stress of 0.002 to 0.005 MPa.

5. A hollow fiber carbon membrane produced by the production method according to claim 3.

6. The hollow fiber carbon membrane according to claim 5, wherein the surface is further subjected to chemical vapor deposition using hydrocarbon gas.

7. A hollow fiber carbon membrane produced by the production method according to claim 4.

8. The hollow fiber carbon membrane according to claim 7, wherein the surface is further subjected to chemical vapor deposition using hydrocarbon gas.

* * * * *

UNITED STATES PATENT AND TRADEMARK OFFICE
CERTIFICATE OF CORRECTION

PATENT NO. : 10,150,085 B2
APPLICATION NO. : 15/515940
DATED : December 11, 2018
INVENTOR(S) : Masataka Kondo, Kensuke Watanabe and Hirokazu Yamamoto It is certified that error appears in the above-identified patent and that said Letters Patent is hereby corrected as shown below:

On the Title Page

In the Foreign Application Priority Data section please insert the additional priority data that was omitted as follows:
--Oct. 30, 2014 (JP)..........2014-221063--

Signed and Sealed this
Sixteenth Day of April, 2019

Andrei Iancu
*Director of the United States Patent and Trademark Office*